US012611815B2

(12) United States Patent
Shields et al.

(10) Patent No.: US 12,611,815 B2
(45) Date of Patent: Apr. 28, 2026

(54) 3D PRINTING SYSTEM FOR PREPARING A THREE-DIMENSIONAL OBJECT WITH AN AUTOCLAVE

(71) Applicant: Sulzer Management AG, Winterthur (CH)

(72) Inventors: Stephen Shields, The Woodlands, TX (US); Daniele Tammaro, Zürich (CH); Ulla Trommsdorff, Zürich (CH); Claudio Walker, Winterthur (CH)

(73) Assignee: Sulzer Management AG, Winterthur (CH)

( * ) Notice: Subject to any disclaimer, the term of this patent is extended or adjusted under 35 U.S.C. 154(b) by 751 days.

(21) Appl. No.: 17/270,181

(22) PCT Filed: Aug. 26, 2019

(86) PCT No.: PCT/EP2019/072725
§ 371 (c)(1),
(2) Date: Feb. 22, 2021

(87) PCT Pub. No.: WO2020/043669
PCT Pub. Date: Mar. 5, 2020

(65) Prior Publication Data
US 2021/0323221 A1      Oct. 21, 2021

(30) Foreign Application Priority Data

Aug. 30, 2018    (EP) ..................................... 18191765

(51) Int. Cl.
B29C 64/118 (2017.01)
B29C 64/209 (2017.01)
(Continued)

(52) U.S. Cl.
CPC .......... B29C 64/118 (2017.08); B29C 64/209 (2017.08); B29C 64/295 (2017.08);
(Continued)

(58) Field of Classification Search
CPC ...................................................... B29C 64/00
See application file for complete search history.

(56) References Cited

U.S. PATENT DOCUMENTS

2014/0141168 A1* 5/2014 Rodgers ................ B33Y 70/00
427/265
2014/0291886 A1* 10/2014 Mark ..................... B33Y 10/00
264/259
(Continued)

FOREIGN PATENT DOCUMENTS

CN        102233353 B      4/2014
CN        106493968 A      3/2017
(Continued)

OTHER PUBLICATIONS

EP 3243633 A1, EPO english translation (Year: 2017).*
(Continued)

*Primary Examiner* — Susan D Leong
(74) *Attorney, Agent, or Firm* — Spencer Fane, LLP

(57) ABSTRACT

A three-dimensional printing system for preparing a three-dimensional object made at least partially of an expanded polymer includes an autoclave, a printing device and a three-dimensional movement device. The printing device prepares an expandable polymer melt and deposits a strand of the expandable, expanding or expanded polymer onto a surface. The three-dimensional movement device adjusts the position of the printing device in a predefined three-dimensional matrix so as to enable depositing of the strand of expandable, expanding or expanded polymer at a predetermined time at a precise position within the three-dimensional matrix. The printing device includes a feed section, a cooling section, a backflow prevention section, a heating section and a terminal printing head section including a die for depositing the expandable, expanding or expanded polymer strand onto the surface.

11 Claims, 6 Drawing Sheets

(51) Int. Cl.

| | |
|---|---|
| *B29C 64/295* | (2017.01) |
| *B29C 64/314* | (2017.01) |
| *B29C 64/321* | (2017.01) |
| *B29K 101/12* | (2006.01) |
| *B33Y 10/00* | (2015.01) |
| *B33Y 30/00* | (2015.01) |
| *B33Y 40/10* | (2020.01) |
| *B33Y 70/00* | (2020.01) |

(52) U.S. Cl.

CPC .......... *B29C 64/314* (2017.08); *B29C 64/321* (2017.08); *B33Y 10/00* (2014.12); *B33Y 30/00* (2014.12); *B33Y 40/10* (2020.01); *B33Y 70/00* (2014.12); *B29C 2791/007* (2013.01); *B29K 2101/12* (2013.01)

(56) References Cited

U.S. PATENT DOCUMENTS

| | | | | |
|---|---|---|---|---|
| 2016/0193778 | A1* | 7/2016 | Lee ......................... | B33Y 40/00 425/378.1 |
| 2018/0015659 | A1* | 1/2018 | Cheng ................... | B29C 64/386 |
| 2019/0336749 | A1* | 11/2019 | Daglow ............... | A61N 1/0488 |
| 2020/0039148 | A1* | 2/2020 | Jähnicke ............... | B29C 48/266 |
| 2020/0361149 | A1* | 11/2020 | Arao ..................... | B29C 64/393 |

FOREIGN PATENT DOCUMENTS

| | | | |
|---|---|---|---|
| EP | 3243633 | A1 * | 11/2017 |
| JP | 2015-168135 | A | 9/2015 |
| WO | 2017204433 | A1 | 11/2017 |
| WO | 2018093145 | A1 | 5/2018 |

OTHER PUBLICATIONS

EP-3243633-A1 EPO translation (Year: 2017).*

3D Printing of Polymers with Hierarchical Continuous Porosity, Matteo Gregorio Modesto Marascio et al. (Year: 2012).*

Extended European Search Report issued Apr. 9, 2019 in corresponding European Patent Application No. 18191765.9, filed Aug. 30, 2018.

International Search Report and Written Opinion issued Nov. 18, 2019 in corresponding International Patent Application No. PCT/EP2019/072725, filed Aug. 26, 2019.

International Preliminary Report on Patentability issued Mar. 2, 2021 in corresponding International Patent Application No. PCT/EP2019/072725, filed Aug. 26, 2019.

Taiwanese Office Action (and EN Translation) and search report issued in corresponding Taiwanese Application No. 108131047, Aug. 16, 2022.

* cited by examiner

3D PRINTING SYSTEM FOR PREPARING A THREE-DIMENSIONAL OBJECT WITH AN AUTOCLAVE

CROSS-REFERENCE TO RELATED APPLICATIONS

This application is a U.S. National Stage application of International Application No. PCT/EP2019/072725, filed Aug. 26, 2019, which claims priority to European Patent Application No. 18191765.9, filed Aug. 30, 2018, the contents of each of which are hereby incorporated herein by reference.

BACKGROUND

Field of the Invention

The present invention relates to a three-dimensional printing system for preparing a three-dimensional object made at least partially of an expanded polymer, such as of polystyrene foam, as well as to a method for preparing a three-dimensional object made at least partially of an expanded polymer.

Background Information

Expanded polymers, i.e. polymer foams, are cellular structures, which generally have a low density. Foams are divided in closed-cell foams, open-cell foams, mixed-cellular foams and integral foams. While closed-cell foams comprise cells, which are completely surrounded by the solid polymer material and which are filled with gas, the cells of open-cell foams are not completely surrounded by the solid polymer material and thus interconnected with each other. Due to this, open-cell foams can absorb liquid, such as water, whereas closed-cell foams do not. Mixed-cellular foams comprise open-cells as well as closed-cells, whereas integral foams have thick, non-cellular or at least essentially non-cellular outer walls and therebetween a cellular core, wherein the density reduces from the outer walls to the inner core essentially continuously.

Foams are easily formable, have a low tensile strength, have a high acoustic insulation property and furthermore have a low thermal conductivity. Due to these properties, foams are easily workable and are applied in various commercial areas. For instance, closed-cell foams, such as those made of polystyrene or polyurethane, are used as thermal insulating materials in a plurality of sectors of industry, such as e.g. building insulation materials. Other examples for the commercial application of foams are acoustic insulating materials, cushioning, mattresses, mats and sponges.

Foams can be made of nearly all commercially available polymers, such as of ethylene-vinyl acetate, of polyethylene, of nitrile rubber, of a copolymer of acrylonitrile and butadiene, of polychloroprene, of polyimide, of polyester, of polypropylene, of polystyrene, of polyurethane, of polylactic acid and of polyvinyl chloride.

Several conventional methods for producing foam articles are known. One example therefore is the direct injection expanded foam molding process, in which a pressurized polymer melt including a blowing agent is injected through nozzles into a mold. In the mold, in which a lower pressure is present than the pressure of the pressurized polymer melt, the blowing agent expands, thus forming the polymer foam in the desired shape. Another example is to incubate polymer granulates in an autoclave at an elevated temperature and under pressure with a blowing agent, such as carbon dioxide, before the pressure is released and the temperature lowered so as to foam the granulates to foam beads. These foam beads can then be injected into a mold, before the foam beads are heat fused therein into the desired shape by the application of pressure and steam. Still another example therefore is to form expandable polymer beads by extruding a pressurized, blowing agent including polymer melt through the dies of a die plate and by granulating the polymer melt strands directly behind the dies in an underwater granulator, in which the polymer melt is cooled under pressure so as to avoid an expansion of the polymer strand. The expandable polymer beads may then be foamed and fused in a mold into an article having the desired shape.

SUMMARY

Recently, producing the foamed articles making use of three-dimensional (3D) printing has been proposed. This method has the advantage that no moldings, which are laborious and expensive to produce, are required. Moreover, 3D printing is fast, allows to change the material during the process and generates only very small amounts of waste.

CN 106493968 A discloses a method and an apparatus for producing a foamed product based on 3D printing. The apparatus comprises a 3D printer as molding unit, a supercritical infiltration unit and a foaming unit. While the supercritical infiltration unit comprises a preheater, a booster pump, a carbon dioxide storage tank and an infiltration vessel, the foaming unit is mainly composed of a steam generator, a foam box and a cover plate. The method comprises the following steps: firstly, printing a three-dimensional model of a polymer melt via the 3D printer; secondly, then putting the formed three-dimensional model into the infiltration vessel of the supercritical infiltration unit and infiltrating supercritical carbon dioxide and thirdly, carrying out steam foaming of the three-dimensional model in the foam box so as to obtain the foamed product.

It has been found that this process has several drawbacks. First, the process does not allow for the production of hybrid articles comprising foamed sections and non-foamed sections. Rather, this method only allows for the production of articles, which are completely and uniformly foamed. In addition, the foam structure and the density of the foamed product produced with this method cannot be satisfyingly controlled.

In view of this, the object underlying the present invention is to provide a 3D printing system and a method for preparing a three-dimensional object made at least partially of an expanded polymer, which is more flexible and which particularly enables control of the foam structure and the density of the foamed product and enables the production of hybrid articles comprising foamed sections and non-foamed sections.

In accordance with the present invention, this object is satisfied by providing a three-dimensional printing system for preparing a three-dimensional object made at least partially of an expanded polymer comprising:

i) an autoclave, ii) a printing device for preparing an expandable polymer melt and for depositing a strand of the expandable, expanding or expanded polymer onto a surface and iii) a three-dimensional movement device for adjusting the position of the printing device in a predefined three-dimensional matrix so as to allow to deposit the strand of expandable, expanding or expanded polymer at a predetermined time at a precise position within the three-dimensional matrix, wherein the printing device comprises:

a) a feed section, b) a cooling section, c) a backflow prevention section, d) a heating section, and e) a terminal printing head section including a die for depositing the expandable, expanding or expanded polymer strand onto the surface.

The 3D printing system in accordance with embodiments of the present invention does not deposit a polymer strand onto the target surface, which has subsequently to be injected with blowing agent and then foamed. Rather, the 3D printing system in accordance with the present invention deposits a strand of a mixture of polymer including a blowing agent onto the target surface. In the autoclave, an expandable polymer including a blowing agent dispersed therein is prepared and provided, which is then fed into the feed section a) of the printing device. The expandable polymer including the blowing agent dispersed therein is then molten in the heating section d) of the printing device, before the expandable polymer melt including the blowing agent dispersed therein is deposited onto the target surface by pressing it through the die of the terminal printing head section of the printing device. In dependency of, among others, the flow rate and of the temperature of the expandable polymer melt including the blowing agent dispersed therein adjusted in the heating section of the printing device a strand of expandable polymer, expanding polymer or expanded polymer is deposited onto the target surface. If the temperature of the mixture is sufficiently low in the terminal printing head section, the mixture will only expand or foam, respectively, after leaving the terminal printing head section, when it is subjected to the ambient temperature outside the printing device, so that a strand of expandable polymer, i.e. of non-expanded polymer, is deposited, which expands during the deposition or immediately thereafter on the surface. However, if the temperature of the mixture in the terminal printing head section is higher, then the mixture will already expand or foam, respectively, when leaving the terminal printing head section (so that a strand of expanding polymer is deposited) or even before leaving the terminal printing head section (so that a strand of already expanded polymer is deposited). Thus, the 3D printing system in accordance with the present invention is very flexible with this regard. In addition, the 3D printing system in accordance with the present invention enables a change in the concentration of the blowing agent in the mixture of polymer including the blowing agent in the printing device, enables a change to the temperature of the mixture in the printing device by changing the temperature of the heating section, enables a change to the flow rate of the mixture through the printing device and enables a change to the kind of polymer fed into the printing device over the time. Based on these reasons, the 3D printing system in accordance with embodiments of the present invention enables control of the foam structure and the density of the foamed product at discretion. Moreover, it enables production of hybrid articles comprising foamed sections and non-foamed sections, by temporarily stopping the addition of expandable polymer including a blowing agent dispersed therein formed in the autoclave and/or by temporarily replacing the expandable polymer prepared in the autoclave with polymer without added blowing agent, i.e. by temporarily feeding into the feed section of the printing device not the expandable polymer including the blowing agent dispersed therein formed in the autoclave, but by temporarily feeding into the feed section of the printing device polymer without any added a blowing agent. All in all, the present invention provides a 3D printing system and a method for preparing a three-dimensional object made at least partially of an expanded polymer, which is more flexible and which particularly enables control of the foam structure and the density of the foamed product and enables production of hybrid articles comprising foamed sections and non-foamed sections.

In order to allow the autoclave to be used for all of the commercially important polymers, it is preferred that the autoclave is capable of resisting pressures up to 150 bar and temperatures up to 300° C.

In accordance with an embodiment of the present invention, the autoclave is arranged upstream of the printing device so that an expandable polymer including a blowing agent dispersed therein prepared in the autoclave is transported from the autoclave into the feed section of the printing device. For this purpose, the autoclave can be connected directly or indirectly with the feed section of the printing device so that expandable polymer mixture, such as in particular in the form of expandable polymer beads or expandable polymer filaments, prepared in the autoclave can be transferred from the autoclave directly or indirectly into the feed section of the printing device.

This is achieved in accordance with a preferred embodiment of the present invention in that the autoclave is connected directly with the feed section of the printing device so that expandable polymer mixture prepared in the autoclave can be transferred from the autoclave directly into the feed section of the printing device. Directly means in this connection that the expandable polymer including a blowing agent dispersed therein as prepared in the autoclave is fed via a line batchwise or even semi-continuously from the autoclave into the feed section of the printing device.

In accordance with an alternatively preferred embodiment of the present invention, the autoclave is connected indirectly with the feed section of the printing device. This means that between the autoclave and the feed section of the printing device a transport means is arranged, with which the expandable polymer mixture including the blowing agent dispersed therein as prepared in the autoclave is fed batchwise or even semi-continuously from the autoclave into the feed section of the printing device. For instance, a conveyor can be arranged as transport means or device between the autoclave and the feed section of the printing device, a conveyor can be arranged as transport means or device so that expandable polymer including the blowing agent dispersed therein prepared in the autoclave can be transferred from the autoclave via the conveyor into the feed section of the printing device. Preferably, the conveyor is a conveyor belt, or the conveyor is the arrangement of two rolls being arranged so that they may convey beads or filaments of expandable polymer including a blowing agent dispersed therein from the autoclave into the feed section of the printing device.

In principle, the present invention is not particularly limited to the form of the printing device and its sections. Thus, one or more of the sections can have e.g. a square, a rectangular, an ellipsoid or a circular cross-section, wherein the dimensions of the single sections can be the same or different to each other. Good results are in particular obtained, when one or more of the feed section a), the cooling section b), the backflow prevention section c), the heating section d) and the printing head section e) have a circular cross-section and are thus (seen three-dimensionally) tubular. Each of the sections can have the same inner diameter or a different inner diameter of, for instance, 1 to 10 mm or of 2 to 4 mm. More preferably, all of the feed section a), the cooling section b), the backflow prevention section c), the heating section d) and the printing head section e) are tubular sections having the same inner diameter, which is preferably between 1 and 10 mm and more preferably between 2 and 4 mm.

Also, the present invention is in principle not particularly limited to the order of the single sections of the printing device as long as the cooling section b) and the backflow prevention section c) are arranged upstream of the heating section d). Section denotes in this context a longitudinal segment, i.e. a segment extending in the longitudinal direction of the printing device.

In accordance with one particular preferred embodiment of the present invention, the feed section a), the cooling section b), the backflow prevention section c), the heating section d) and the printing head section e) are arranged in this order from an upstream end to a downstream end of the printing device.

In accordance with an alternative embodiment of the present invention, the feed and cooling sections a) and b) are combined to one section, i.e. the feed section a) is embodied so as to also be the cooling section c). Downstream of this combined section a), b) follows then the backflow prevention section c) which is in turn followed by the heating section d) which is in turn followed by the terminal printing head section g).

The feed section a) of the printing device is in its simplest embodiment the tubular end section of a pipe. In order to easily convey the expandable polymer mixture prepared in the autoclave into the feed section a) of the printing device, it is in this embodiment preferred that in the autoclave the expandable polymer mixture is prepared in the form a beads or a filament having a diameter matching the inner diameter of the tubular feed section a) of the printing device.

Preferably, the cooling section b) is a tubular section comprising a tube, wherein a Peltier element, a heat exchanger or cooling fins are provided on the outer wall of the tube. Most preferably, the cooling section b) is a tubular section comprising a tube, wherein cooling fins are provided on the outer wall of the tube.

As the backflow prevention section c), any means or suitable device can be used, which prevents that expandable polymer melt from the downstream heating section d) flows up—in upstream direction of the printing device—into the cooling section b) or even into the feed section a). Good results are particularly obtained, when the backflow prevention section c) is a tubular section, wherein the inner diameter of the tube is at least over a part of its length smaller than the inner diameter of the upstream cooling sections b) and/or smaller than the inner diameter of the downstream heating section d). Even more preferably, the backflow prevention section c) is a tubular section, wherein the inner diameter of the tube is at least over a part of its length smaller than the inner diameter of the upstream cooling section b) and smaller than the inner diameter of downstream heating section d).

In a further development of the present invention, it is proposed that the backflow prevention section c) comprises one or more O-rings or baffle rings, which reduce the inner the inner diameter of the tube over a part of its length. This reliably assures that no expandable polymer melt flows up from the downstream heating section d)—in upstream direction of the printing device—into the cooling section b) or even into the feed section a).

In accordance with a particularly preferred embodiment of the present invention, the backflow prevention section c) comprises two to five O-rings or baffle rings, which are arranged, spaced from each other, over the lengths of the tube, wherein each of the O-rings or baffle rings reduces the inner diameter of the tube of the backflow prevention section c) compared to the areas of the tube of the backflow prevention section c) being free from the O-rings or baffle rings. This particularly reliably assures that no expandable polymer melt flows up from the downstream heating section d)—in upstream direction of the printing device—into the cooling section b) or even into the feed section a).

In order to form the heating section, the respective heating section d) of the printing device can include any means or suitable device, which is able to heat an expandable polymer including a blowing agent dispersed therein present in the pipe so that it melts. For instance, the respective heating section d) of the printing device can include an active heating element, such as a Peltier element or a resistance heater, or with a heat exchanger. More specifically, a Peltier element, a resistance heater or a heat exchanger can be disposed on the outer wall of the heating section d), which is in particular preferred, if the heating section b) of the printing device is a tubular section so that the Peltier element, the resistance heater or the heat exchanger is disposed on the outer wall of the tube.

In accordance with another particularly preferred embodiment of the present invention, the printing head section e) is a tapered tubular section, wherein the downstream part of the printing head section e) is tapered so as to form the die. Preferably, the upstream part of the printing head section e) has the same inner diameter as at least one of the feed section a), the cooling section b), the backflow prevention section c) and the heating section d) and more preferably has the same inner diameter as all of the feed section a), the cooling section b), the backflow prevention section c) and the heating section d). The inner diameter of these sections is preferably 1 to 10 mm and more preferably 2 to 4 mm. The die has preferably an inner diameter of 0.1 to 1.0 mm and more preferably of 0.1 to 0.5 mm.

According to another aspect, the present invention relates to a method for preparing a three-dimensional object made at least partially of an expanded polymer, wherein the method is performed in the aforementioned three-dimensional printing system.

Preferably, the method comprises the following steps:
a) providing polymer preferably in the form of beads or filaments,
b) impregnating the polymer provided in step a) in an autoclave with a blowing agent at a temperature below the melting point of the polymer and preferably at a pressure of 2 to 50 MPa for 1 minute to 48 hours and preferably for 1 to 24 hours so as to provide an expandable polymer mixture,
c) transferring the expandable polymer mixture provided in step b) into the feed section of the printing device,
d) cooling the expandable polymer mixture in the printing device,
e) heating the expandable polymer mixture in the printing device so as to obtain an expandable polymer melt and
f) shaping, depositing and foaming the expandable polymer melt by extruding it through the die of the printing device.

Steps b) and c) can be performed simultaneously or in succession.

In order to adjust the size of the bubbles formed by the blowing agent during the expansion, it is suggested in a further development of the present invention that the expandable polymer mixture provided in step a) preferably in the form of beads or filaments comprises at least one nucleating agent.

Good results are in particular obtained, when the nucleating agent is selected from the group consisting of talc, waxes, graphite, bentonites and arbitrary combinations of two or more of the aforementioned compounds.

The present invention can be performed with any foamable polymer. Suitable examples therefore are polymers selected from the group consisting of thermoplastic polyurethanes, polyolefins (such as polyethylenes or polypropylenes), polyesters (such as polyethylene terephthalates), ethylene vinylacetate copolymers, ethylene butyl acrylate copolymers, polystyrenes, polylactic acids, thermoplastic elastomers, nitrile rubbers, copolymers of acrylonitrile and butadiene, polychloroprenes, polyimides, polyvinyl chlorides and arbitrary combinations of two or more of the aforementioned polymers.

Even if embodiments of the present invention can be performed with one or more chemical blowing agents, it is particularly preferred that the blowing agent used in the method in accordance with the present invention is a physical blowing agent. Preferred examples for the physical blowing agent are those selected from the group consisting of carbon dioxide, nitrogen, water, cyclopentane, isobutane, pentane and arbitrary combinations of two or more of the aforementioned compounds.

Depending on the kind of polymer applied, the expandable pressurized polymer melt obtained in step e) can have a temperature of 60 to 270° C. and is pressurized to 2 to 50 MPa.

For instance, if the polymer is a polystyrene, it is preferred that the expandable polymer melt obtained in step e) has a temperature of 130 to 170° C. and is pressurized to 2 to 50 MPa.

In accordance with a further aspect, the present invention relates to a three-dimensional object, which is obtainable with the aforementioned method. The three-dimensional object can be in particular an acoustic insulating material, a cushioning, a mattress, a mat, a sponge, a shoe sole, a sports shoe, a protective equipment, a support structure or a filling structure.

BRIEF DESCRIPTION OF DRAWINGS

The invention will be explained in more detail hereinafter with reference to the drawings.

DETAILED DESCRIPTION

Figure 1:
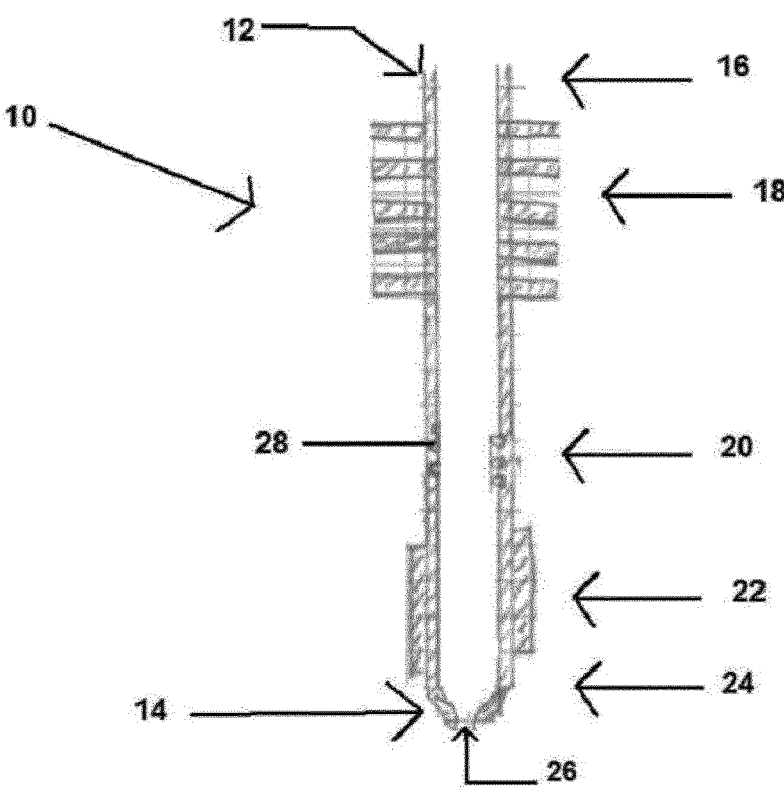
FIG. 1 shows a schematic cross-section of a printing device for preparing an expandable polymer melt and for depositing a strand of the expandable, expanding or expanded polymer onto a surface of a 3D printing system for preparing a three-dimensional object made at least partially of an expanded polymer in accordance with one exemplary embodiment of the present invention.

The printing device 10 shown in FIG. 1 comprises from its upstream end 12 to its downstream end 14 the following sections in this order:

a) a feed section 16, b) a cooling section 18, c) a backflow prevention section 20, d) a heating section 22 and e) a terminal printing head section 24 including a die 26 for depositing the expandable, expanding or expanded polymer strand onto the surface.

While the feed section 16 is the upstream tubular end section of the printing device 10, the cooling section 18 is embodied as tubular section provided on the outer wall thereof with cooling fins. The heating section 22 is a tubular section comprising Peltier elements on the outer tube wall, whereas the backflow prevention section 20 comprises three O-rings 28, which are arranged, spaced from each other, over the lengths of the tube, wherein each of the O-rings 28 reduces the inner diameter of the tube compared to the areas of the tube being free from the O-rings 28 ings.

During operation, a method for preparing a three-dimensional object made at least partially of an expanded polymer is performed, which comprises the following steps:

a) providing beads or filaments of a polymer, b) impregnating the beads or filaments provided in step a) in an autoclave with a blowing agent at a temperature below the melting point of the polymer and at a pressure of 2 to 50 MPa for 1 minute to 48 hours and preferably for 1 to 24 hours, c) transferring the impregnated beads or filaments provided in step b) into the feed section of the printing device, d) cooling the beads or filaments in the printing device, e) heating the beads or filaments in the printing device so as to obtain an expandable polymer melt, and f) shaping, depositing and foaming the expandable polymer melt by extruding it through the die of the printing device.

Subsequently, the present invention is further illustrated by non-limiting examples and comparative examples.

Examples 1 to 4 and Comparative Examples 1 to 4

Equipment and Process Parameters

A 3D printer with an autoclave in accordance with embodiments of the present patent disclosure was used. Commercially available filament was impregnated the autoclave with the conditions given in Table 1. Then the filament containing the blowing agent was printed with the 3D printer equipped with a 0.4 mm printing nozzle.

Filament TPU: NinjaflexTPU 3DNF0817505 1.75 mm, transparent

Figure 4:
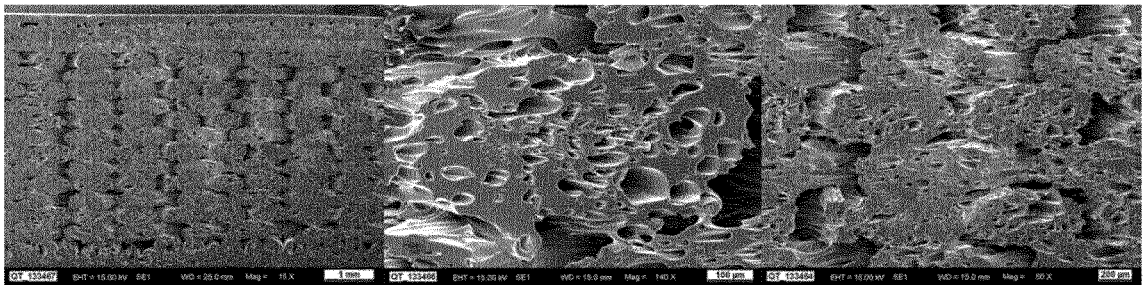
FIG. 4 shows a SEM scan of a cut through the bottom object of FIG. 2.

Filament PLA: PLA Natural Transparent 2.85 mm, from Verbatim contain clearly bubbles as shown in FIG. 4. The SEM scan in FIG. 4 shows the cross section of the foamed rectangular slab at the bottom of FIG. 2.

Figure 5:
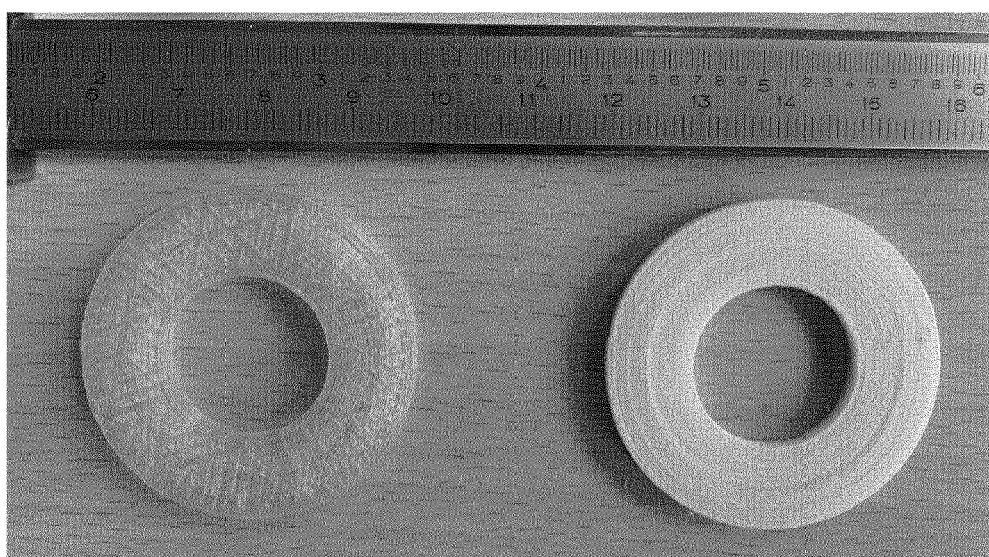
FIG. 5 shows two printed circles.
Figure 6:
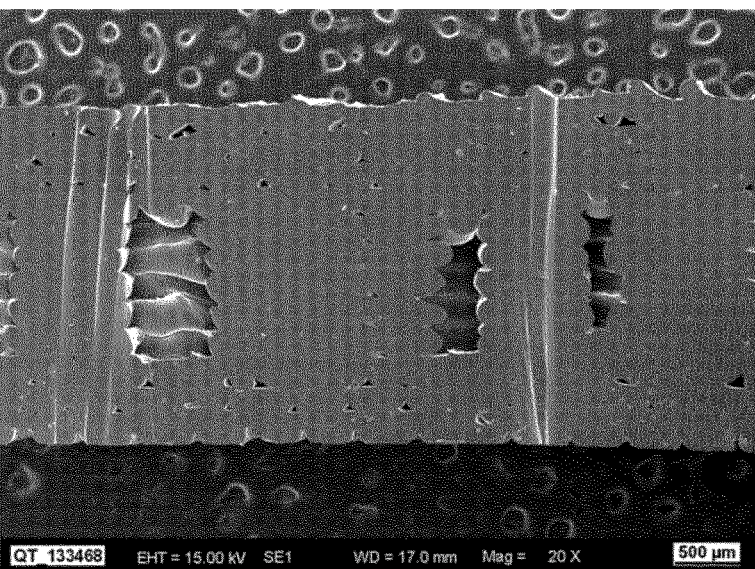
FIG. 6 shows a SEM scan of a cut through the left object of FIG. 5.
Figure 7:
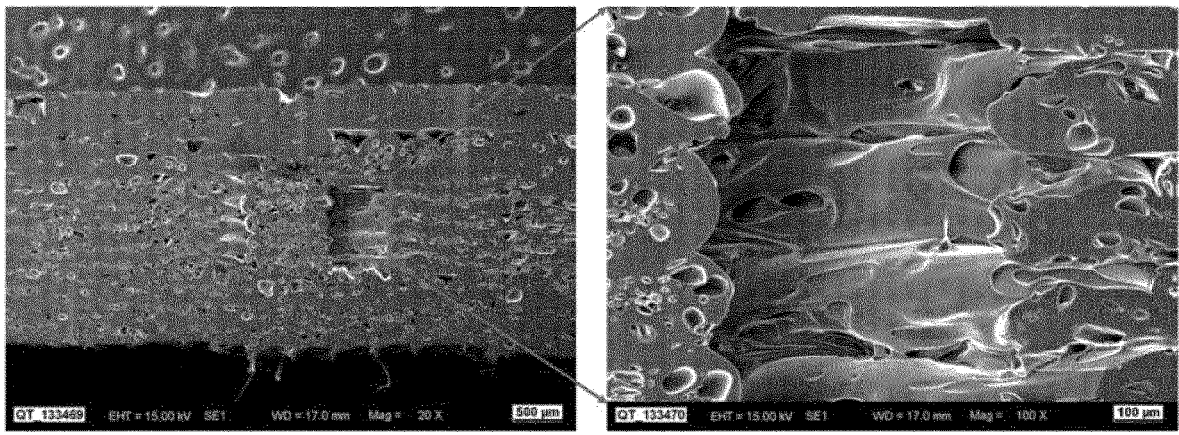
FIG. 7 shows a SEM scan of a cut through the right object of FIG. 5.

FIG. 5 shows two printed circles where the left circle was printed with untreated TPU filament and the right circle was printed with TUP filament impregnated in the autoclave. Again the foamed structure of the right object is visible because the top layer appears white and not transparent as the top layer of the left object. SEM scans along the line indicated in FIG. 5 are shown in FIG. 6 (not foamed) and FIG. 7. As described earlier it is clear that the untreated filament leads to solid strands which were partially surrounded by void areas while the in the strands from the

TABLE 1

Processing conditions and printing results for impregnated filament

Figure 12:
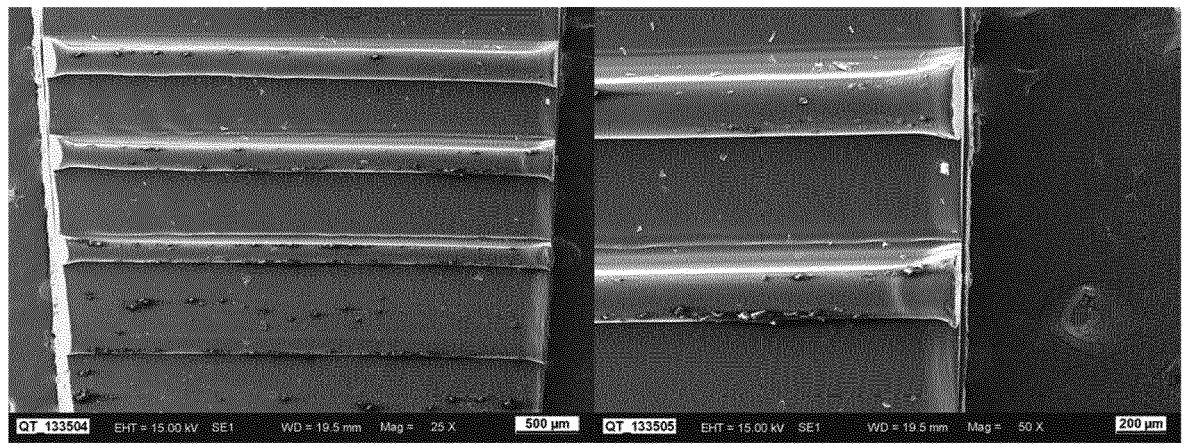
FIG. 12 shows a SEM scan of the surface of the left object of FIG. 11.
Figure 13:
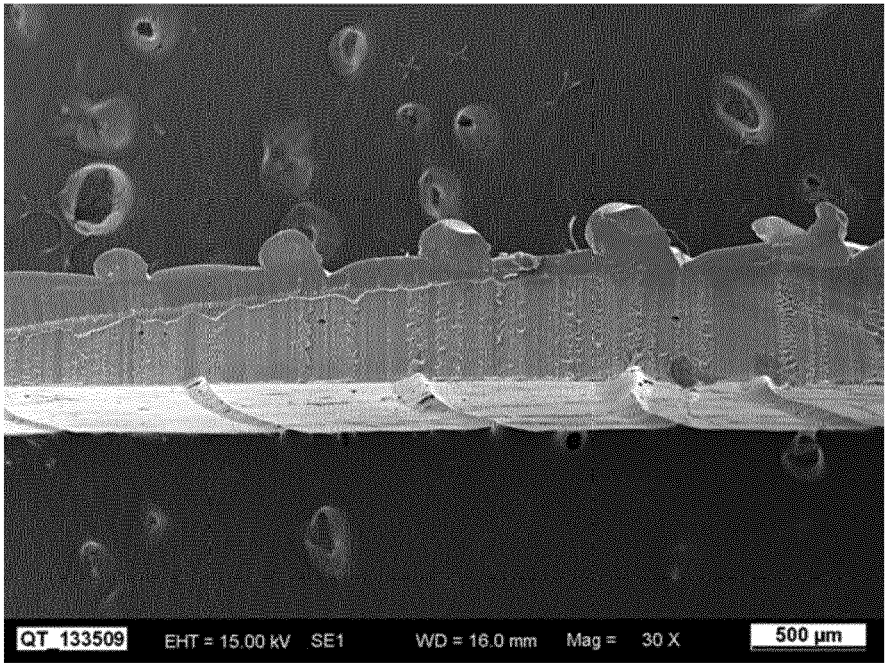
FIG. 13 shows a SEM scan of the cross-section of the left object of FIG. 11.

| Case | Polymer | Blowing agent | Sol. Temp [° C.] | Sol. Time [h] | Sol. Pressure [bar] | Extrusion temp [° C.] | Extrusion speed [mm/min] | Printed shape | Weight reduction | Cell size [um] | FIGS. |
|---|---|---|---|---|---|---|---|---|---|---|---|
| CE1 | TPU | no | na | na | | 230 | 15 | Rectangular slab | | na | FIG. 2, FIG. 3 |
| Ex. 1 | TPU | $CO_2$ | 30 | 1 | 30 | 230 | 15 * 0.6 | Rectangular slab | 30% | 10-50 | FIG. 2, FIG. 4 |
| CE2 | TPU | No | na | Na | na | 210-230 | 15 | Circle | | Na | FIG. 5, FIG. 6 |
| Ex. 2 | TPU | $CO_2$ | 30 | 1 | 40 | 210-230 | 15 * 0.6 | Circle | 20% | 30-60 | FIG. 5, FIG. 7 |
| CE3 | PLA | no | na | Na | na | 220 | 20 | Cube | | | FIG. 8, FIG. 9 |
| Ex. 3 | PLA | $CO_2$ | 70 | 2 | 40 | 220 | 20 * 0.6 | Cube | 45% | 50 | FIG. 8, FIG. 10 |
| CE4 | PLA | No | na | na | Na | 220 | 20 | Monolayer | | | FIG. 11, FIG. 12, FIG. 13 |
| Ex. 4 | PLA | $CO_2$ | 70 | 2 | 40 | 220 | 20 * 0.6 | Monolayer | | 50-100 | FIG. 11, FIG. 14, FIG. 15 |

CE—Comparative Example
Ex.—Example

Results

Rectangular Slab TPU

Figure 2:
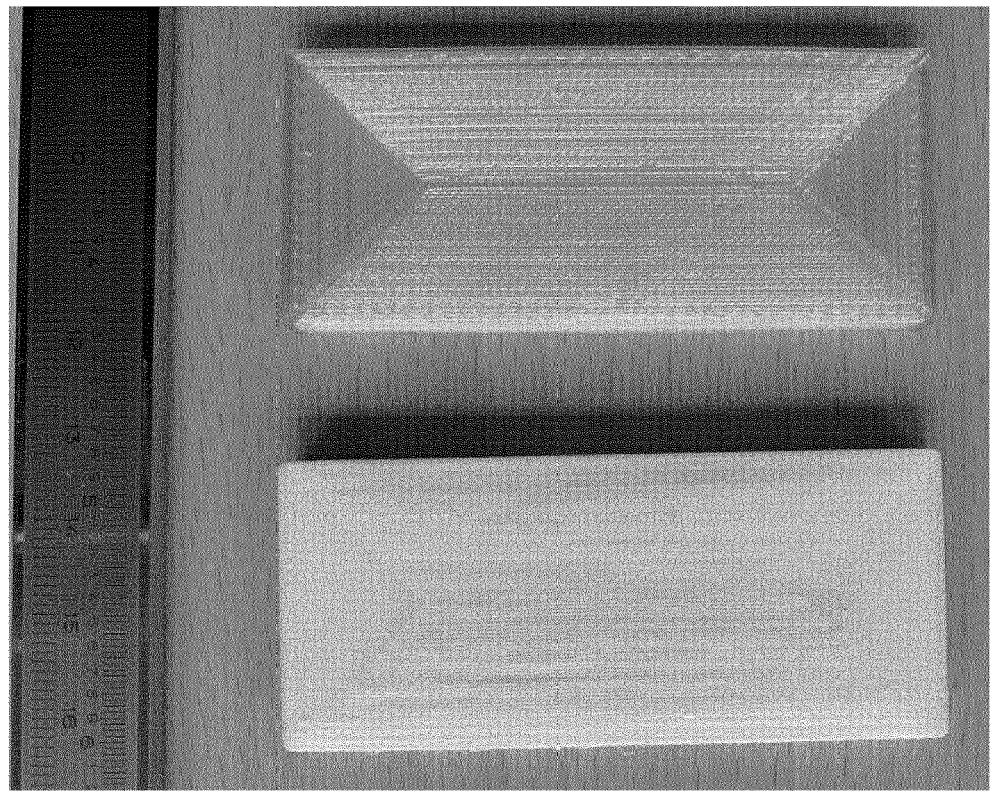
FIG. 2 shows two rectangular slabs printed from TPU as described in the examples and comparative examples.

In FIG. 2 two rectangular slabs printed from TPU are shown. Case 1 (above) was printed with an untreated filament, while Case 2 (below) was printed with the same filament but it was impregnated in the autoclave. Both objects were printed with the same print head temperature. The difference in optical appearance was directly related to the fact that the object below was printed with a foaming filament. The solid TPU was clear and slightly yellow while the foamed TPU appears white. To print both objects shown in FIG. 2 the same movement of the printing nozzle was used. For the print with the impregnated nozzle the extrusion speed of the filament was multiplied with a factor of 0.6. Although both objects have the same geometry, using the impregnated filament resulted in a weight reduction of the object of 30%.

Figure 3:
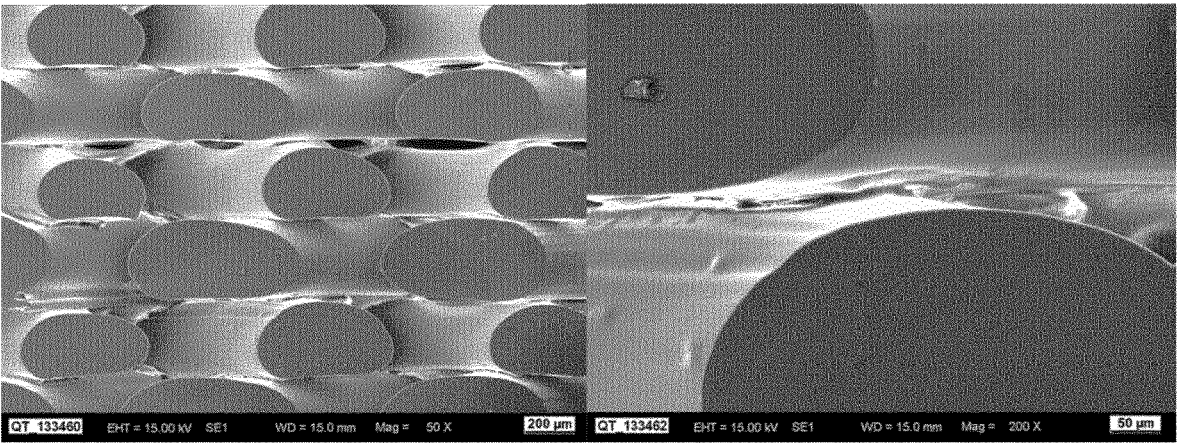
FIG. 3 shows a scanning electron microscope (SEM) scan of a cut through the upper object of FIG. 2.

FIG. 3 shows a scanning electron microscope (SEM) scan of a cut through the upper object. The cut was done along the blue line in FIG. 1. An object made by a 3D printer can always contain void spaces depending on the pattern with of the filament extrusion. It is clearly visible in FIG. 3 that the rectangular slab printed with an untreated filament has such void surfaces. But it is important to note that the strand which was laid down by the printing head was indeed made of solid material. On the other hand, the strands of the filament which was impregnated with CO2 in the autoclave impregnated filament there were also bubbles in the middle of the strand. Again the extrusion speed of the impregnated filament was reduced by a factor of 0.6 and the same movement of the printing nozzle was used for both objects. The foamed circle weights 20% less than the solid circle.

During the printing of the foamed circle (FIG. 5 right), the temperature of the melting section and the nozzle was varied. The printing was started with 210° C. and then increased to 230° C. before it was reduced to 210° C. again. The result is visible in the SEM scan in FIG. 7. A printing temperature of 210° C. is apparently too low to achieve a good foaming of the impregnated filament. In the middle of the object there were more bubbles indicating that the foaming works better at 230° C. This example serves to illustrate that the foam structure can be influenced by adjusting the printing temperature.

Figure 8:
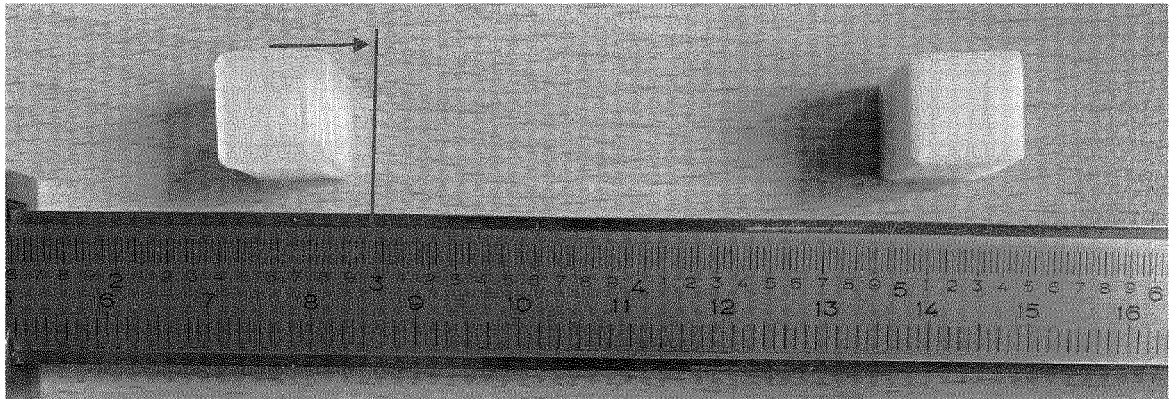
FIG. 8 shows two cubes printed with PLA filament.

Two cubes printed with PLA filament are displayed in FIG. 8. The left cube was printed with untreated filament for the right cube a filament impregnated in the autoclave as described in the patent application was used. Visible that the right cube includes foam (obaque, white) while the left cube was printed from solid polymer (glossy, transparent).

Figure 9:
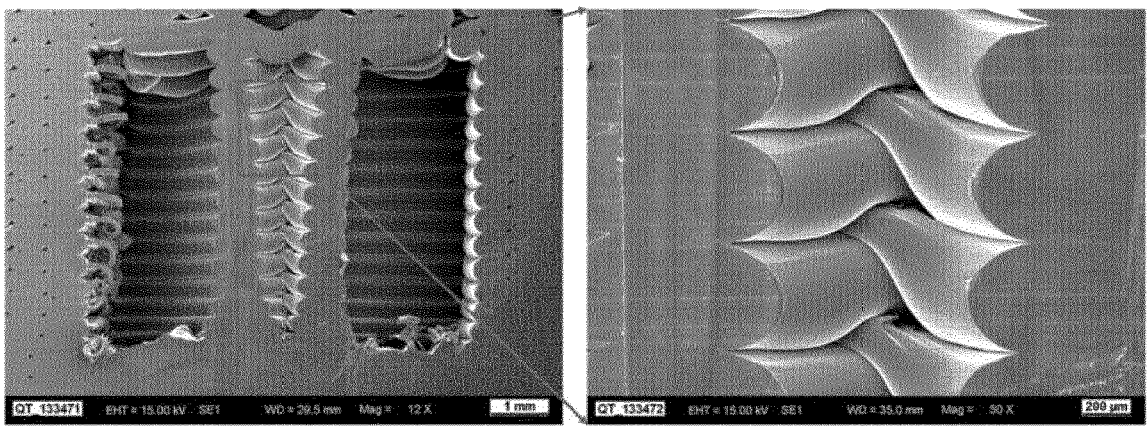
FIG. 9 shows a SEM scan of a cut through the left object of FIG. 8.
Figure 10:
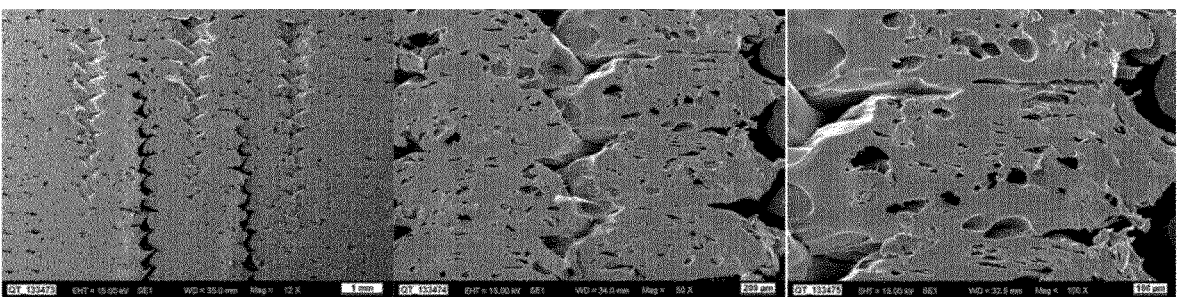
FIG. 10 shows a SEM scan of a cut through the right object of FIG. 8.

SEM cross sections of the PLA cubes are shown in FIG. 9 (not foamed) and FIG. 10 (foamed). Again the bubbles in the printed strands is clearly visible in FIG. 10, while the polymer in the strand in FIG. 9 is homogenous.

PLA Monolayer

Figure 11:
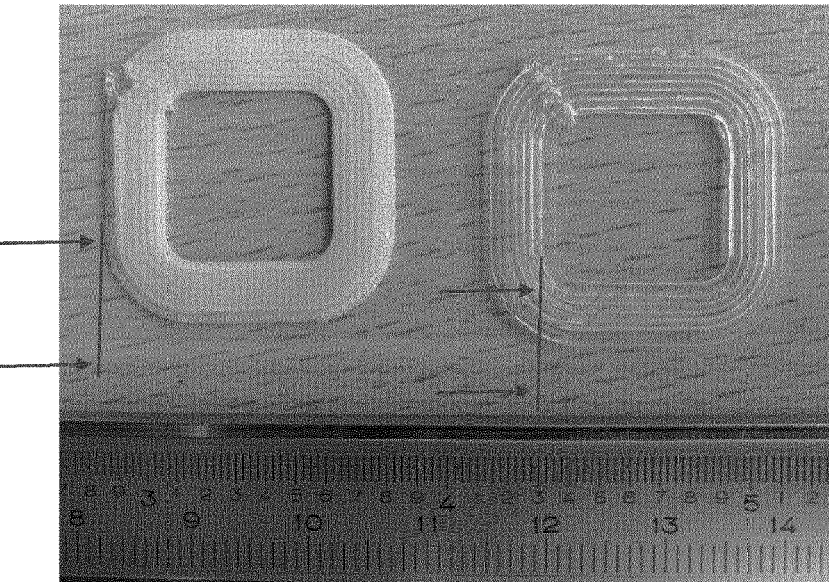
FIG. 11 shows two squares consisting of only one layer of printed strands.
Figure 14:
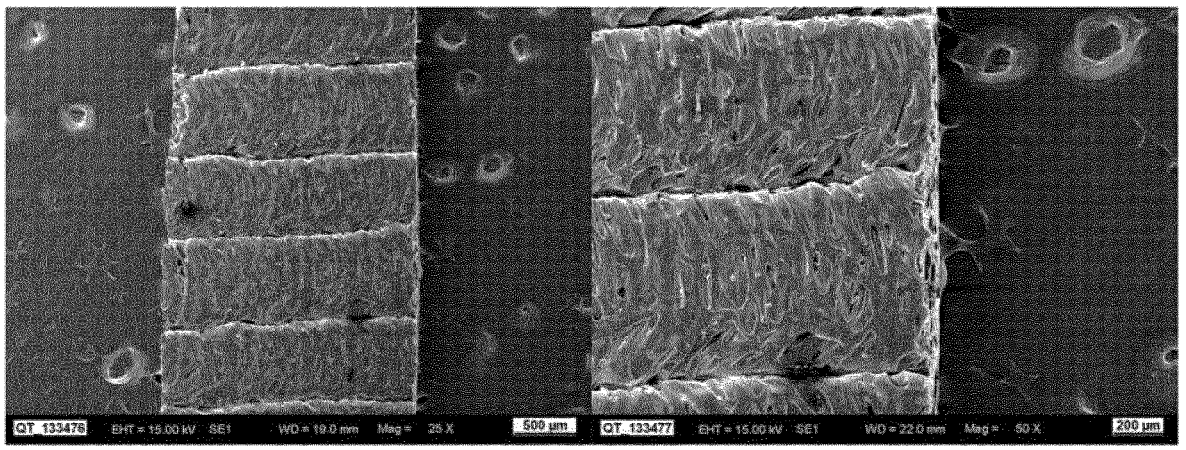
FIG. 14 shows a SEM scan of the surface of the right object of FIG. 11.
Figure 15:
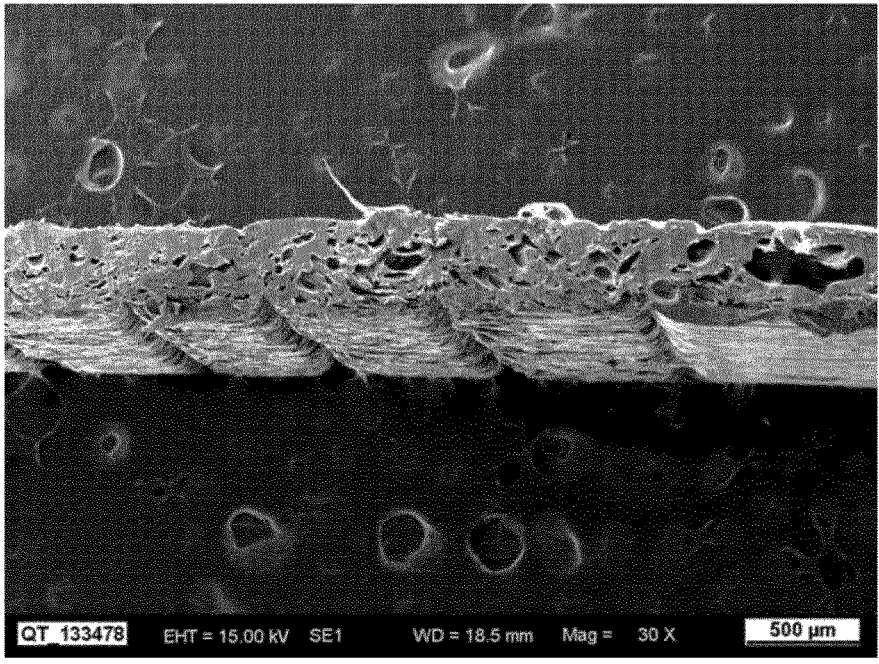
FIG. 15 shows a SEM scan of the cross-section of the right object of FIG. 11.

Two squares consisting of only one layer of printed strands are displayed in FIG. 11. In the monolayer objects it is better visible that the not foamed polymer (right) was transparent, and the foamed object was opaque and white. SEM scans of the surface of the not foamed monolayer square are given in FIG. 12 and the same surface of the foamed object is shown in FIG. 14. SEM scans of the cross section as indicated by the lines in FIG. 11, are given in FIG. 13 and FIG. 15, for the not foamed and the foamed PLA, respectively.

Process Remarks

In all the performed example the foaming process was stable; the polymer filament foamed constantly as function of time, without visible change in size and/or flow rate. The cross section of the 3D printed foamed objects (i.e. FIG. 4, FIG. 7, FIG. 10, FIG. 14 and FIG. 15) show a constant diameter of the foamed filament that is a good evidence of a stable foaming process.

The dimensional precision on the final object was not, visually, affected by the foaming process. In order to compensate the decrease of density, it was decreased the flow rate during printing the foamed object.

Good adhesion among the layers in the foamed objects was confirmed by the SEM pictures.

The invention claimed is:

1. A three-dimensional printing system for preparing a three-dimensional object made at least partially of an expanded polymer comprising:
   an autoclave; and
   a printer configured to prepare an expanding or expanded polymer melt and deposit a strand of the expanding or expanded polymer onto a surface;
   the printer comprising
   a feed section,
   a cooling section,
   a heating section,
   a tubular section located downstream of the cooling section between the cooling section and the heating section, the tubular section configured to prevent the expanded or expanding polymer from flowing upstream into the feed section or the cooling section, and
   a terminal printing head section including a die configured to deposit the expandable, expanding or expanded polymer strand onto the surface,
   the feed section, the cooling section, the tubular section, the heating section and the terminal printing head section being arranged in this order from an upstream end to a downstream end of the printer, and
   an inner diameter of at least a part of a length of the tubular section being smaller than an inner diameter of the cooling section located upstream of the tubular section and being smaller than an inner diameter of the heating section located downstream of the tubular section.

2. The three-dimensional printing system in accordance with claim 1, wherein the autoclave is configured to resist a pressure of up to 150 bar and a temperature of up to 300° C.

3. The three-dimensional printing system in accordance with claim 1, wherein the autoclave is connected directly or indirectly with the feed section of the printer so that an expandable polymer mixture prepared in the autoclave is capable of being transferred from the autoclave directly or indirectly into the feed section of the printer.

4. The three-dimensional printing system in accordance with claim 3, wherein the autoclave is connected directly with the feed section of the printer so that an expandable polymer mixture prepared in the autoclave is capable of being transferred from the autoclave directly into the feed section of the printer.

5. The three-dimensional printing system in accordance with claim 3, wherein a conveyor is arranged between the autoclave and the feed section of the printer so that the expandable polymer mixture prepared in the autoclave can be transferred from the autoclave via the conveyor into the feed section of the printer.

6. The three-dimensional printing system in accordance with claim 1, wherein at least one of the feed section, the cooling section, and the heating section is a second tubular section having a same inner diameter as at least one of an other of the feed section, the cooling section, the tubular section and the heating section.

7. The three-dimensional printing system in accordance with claim 1, wherein at least one of the cooling section and the heating is a second tubular section comprising a tube, and a Peltier element, a heat exchanger or cooling fins are disposed on an outer wall of the tube.

8. The three-dimensional printing system in accordance with claim 1, wherein the terminal printing head section is a tapered tubular section, the downstream part of the terminal printing head section is tapered so as to form the die, and the upstream part of the terminal printing head section has a same inner diameter as at least one of the feed section, the cooling section, the tubular section and the heating section.

9. The three-dimensional printing system in accordance with claim 1, wherein the cooling section comprises a tube having at least one of: a Peltier element, a heat exchanger and cooling fins provided on an outer wall of the tube.

10. The three-dimensional printing system in accordance with claim 9, wherein the cooling section comprises cooling fins provided on the outer wall of the tube.

11. A three-dimensional printing system for preparing a three-dimensional object made at least partially of an expanded polymer comprising: an autoclave; and a printer configured to prepare an expanding or expanded polymer melt and deposit a strand of the expanding or expanded polymer onto a surface; the printer comprising a feed section, a cooling section, a heating section, a tubular section configured to prevent the expanded or expanding polymer from flowing upstream into the feed section or the cooling section, the feed section, the cooling section, the tubular section, the heating section and the terminal printing head section being arranged in this order from an upstream end to a downstream end of the printer, and
   a terminal printing head section including a die configured to deposit the expandable, expanding or expanded polymer strand onto the surface,
   the tubular section located downstream of the cooling section and comprising at least one O-ring that reduces an inner diameter of the tubular section such that the inner diameter of at least a part of a length of the tubular section is smaller than an inner diameter of the cooling section located upstream of the tubular section and is smaller than an inner diameter of the heating section.

* * * * *